(12) United States Patent
Volberding et al.

(10) Patent No.: US 9,583,758 B2
(45) Date of Patent: Feb. 28, 2017

(54) ELECTRODES, BATTERIES, ELECTRODE PRODUCTION METHODS, AND BATTERY PRODUCTION METHODS

(71) Applicant: COPPERWATTS LLC, Liberty Lake, WA (US)

(72) Inventors: Alfred T. Volberding, Kirkland, WA (US); Bradley W. Stone, Elmwood, IL (US)

(73) Assignee: COPPERWATTS LLC, Liberty Lake, WA (US)

( * ) Notice: Subject to any disclaimer, the term of this patent is extended or adjusted under 35 U.S.C. 154(b) by 0 days.

(21) Appl. No.: 14/743,949

(22) Filed: Jun. 18, 2015

(65) Prior Publication Data

US 2015/0287979 A1 Oct. 8, 2015

Related U.S. Application Data

(62) Division of application No. 13/794,599, filed on Mar. 11, 2013.

(Continued)

(51) Int. Cl.
*H01M 4/00* (2006.01)
*H01M 2/22* (2006.01)
(Continued)

(52) U.S. Cl.
CPC ............... *H01M 4/14* (2013.01); *H01M 2/28* (2013.01); *H01M 4/04* (2013.01); *H01M 4/0402* (2013.01); *H01M 4/22* (2013.01); *H01M 4/64* (2013.01); *H01M 4/661* (2013.01); *H01M 4/665* (2013.01); *H01M 4/667* (2013.01); *H01M 4/68* (2013.01); *H01M 4/73* (2013.01); *H01M 10/06* (2013.01); *H01M 2004/028* (2013.01);
(Continued)

(58) Field of Classification Search
CPC ........................................................ H01M 2/00
See application file for complete search history.

(56) References Cited

U.S. PATENT DOCUMENTS 5,093,970 A 3/1992 Senoo et al.
5,098,799 A 3/1992 Bowen et al.
(Continued)

FOREIGN PATENT DOCUMENTS

AU 26392/92 * 10/1992
EP 0109588 A2 5/1984
(Continued)

OTHER PUBLICATIONS

WO PCT/US2013/033765 IPRP, Oct. 1, 2014, Demand Energy Networks, Inc.
(Continued)

*Primary Examiner* — Jacob Marks
(74) *Attorney, Agent, or Firm* — Well St John P.S.

(57) ABSTRACT

Battery electrodes are provided that can include a conductive core supported by a polymeric frame. Methods for manufacturing battery electrodes are provided that can include: providing a sheet of conductive material; and framing the sheet of conductive material with a polymeric material. Batteries are provided that can include a plurality of electrodes, with individual ones of the electrodes comprising a conductive core supported by a polymeric frame.

6 Claims, 9 Drawing Sheets

Related U.S. Application Data

(60) Provisional application No. 61/617,200, filed on Mar. 29, 2012.

(51) Int. Cl.
*H01M 4/14* (2006.01)
*H01M 4/04* (2006.01)
*H01M 4/64* (2006.01)
*H01M 4/66* (2006.01)
*H01M 2/28* (2006.01)
*H01M 4/22* (2006.01)
*H01M 10/06* (2006.01)
*H01M 4/68* (2006.01)
*H01M 4/73* (2006.01)
*H01M 4/02* (2006.01)

(52) U.S. Cl.
CPC ............ *Y02E 60/126* (2013.01); *Y02P 70/54* (2015.11); *Y10T 29/49108* (2015.01)

(56) References Cited

U.S. PATENT DOCUMENTS

| | | | |
|---|---|---|---|
| 5,223,354 A * | 6/1993 | Senoo .................. | H01M 4/745 429/242 |
| 5,508,131 A | 4/1996 | Bowen et al. | |
| 5,607,797 A | 3/1997 | Hasegawa et al. | |
| 6,017,653 A | 1/2000 | Petrakovich et al. | |
| 2010/0183920 A1 | 7/2010 | Shaffer et al. | |
| 2011/0311876 A1 | 12/2011 | Sturgeon et al. | |

FOREIGN PATENT DOCUMENTS

| | | |
|---|---|---|
| EP | 0538645 B1 | 4/1995 |
| EP | 1376808.9 | 7/2015 |
| WO | WO 2005-083817 A1 | 9/2005 |

OTHER PUBLICATIONS

WO PCT/US2013/033765 Search Rep., Jul. 24, 2013, Demand Energy Networks, Inc.
WO PCT/US2013/033765 Written Op., Jul. 24, 2013, Demand Energy Networks, Inc.

\* cited by examiner

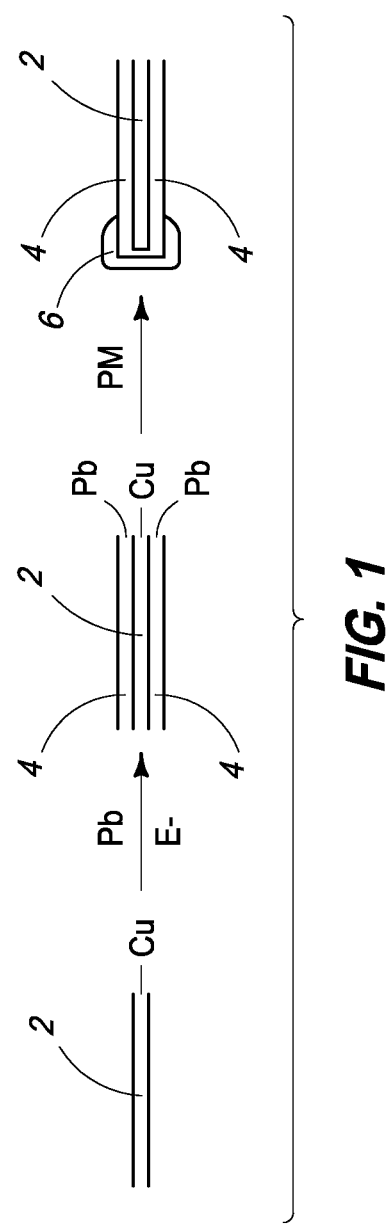

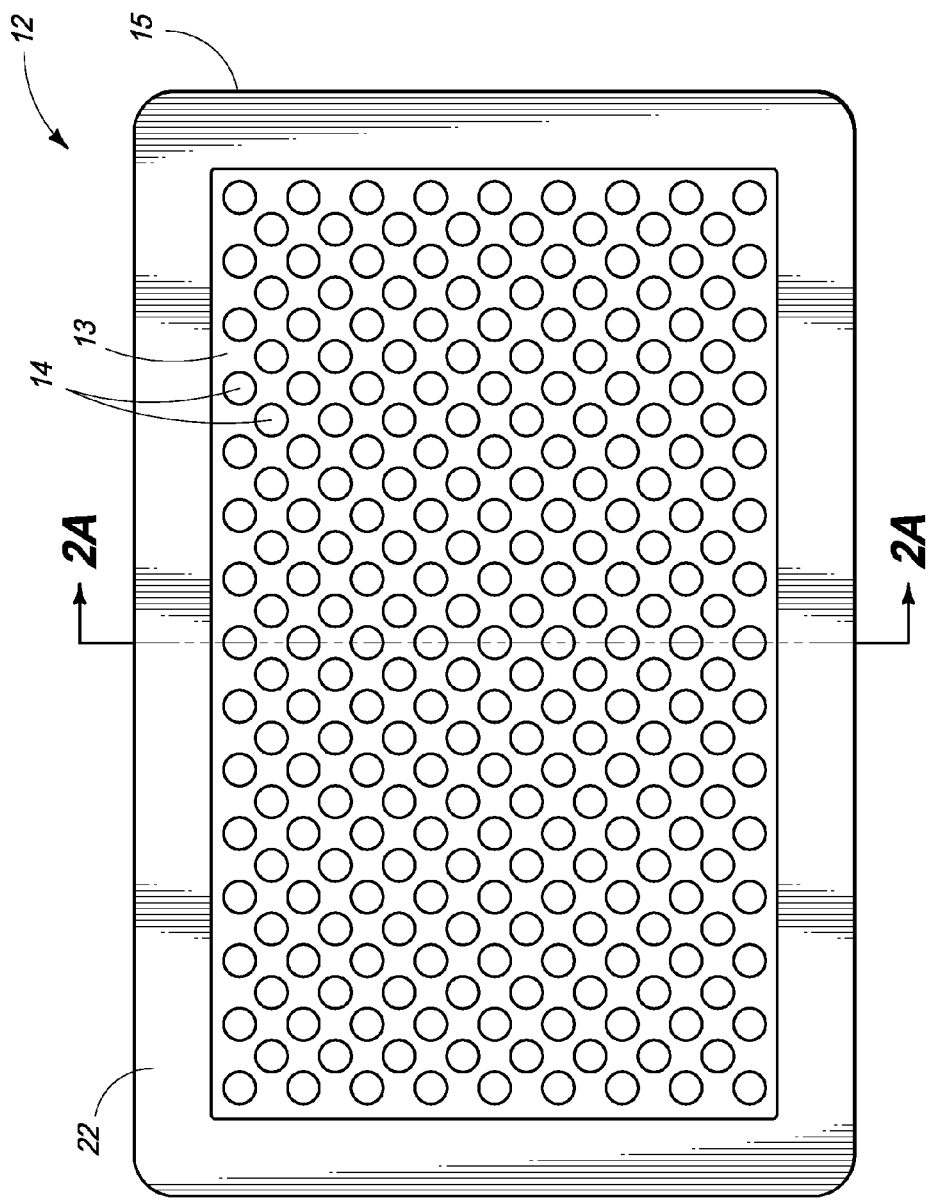
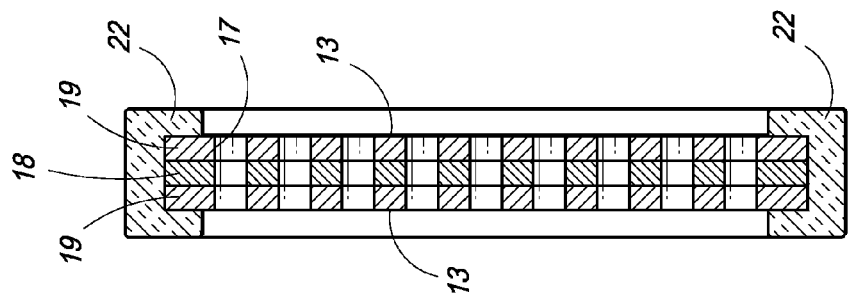

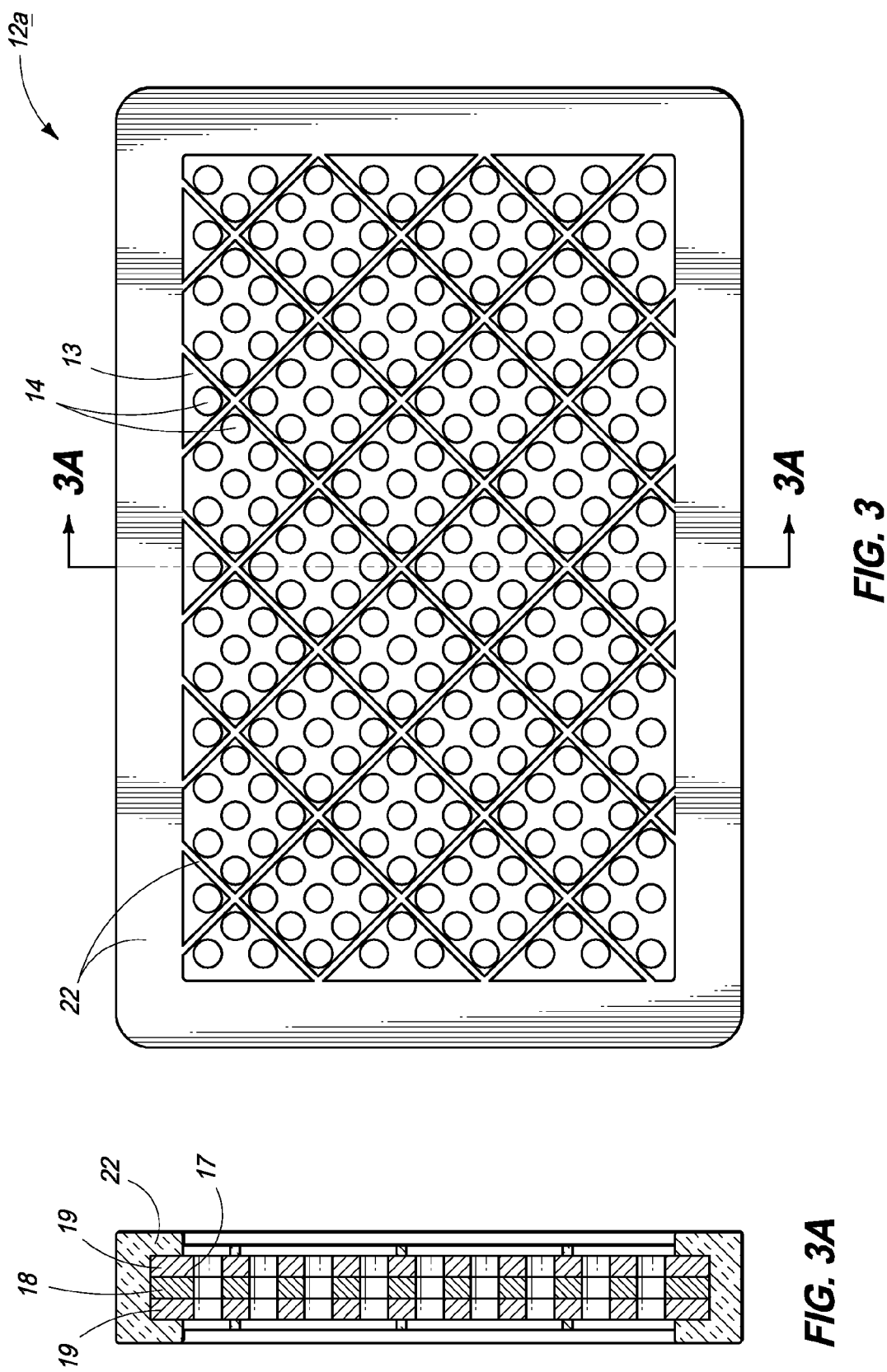

ELECTRODES, BATTERIES, ELECTRODE PRODUCTION METHODS, AND BATTERY PRODUCTION METHODS

CROSS REFERENCE TO RELATED APPLICATION

This application is a divisional of U.S. patent application Ser. No. 13/794,599 which was filed on Mar. 11, 2013, which claims priority to U.S. Provisional Patent Application Ser. No. 61/617,200 which was filed on Mar. 29, 2012, the entirety of each of which are incorporated by reference herein.

TECHNICAL FIELD

The present disclosure relates to electrodes, batteries, electrode production methods, and battery production methods. In more particular embodiments the disclosure relates to Rechargeable Batteries, Lead-Acid Batteries, Battery Components, and Battery Methods. Particular embodiments of the disclosure relate to novel electrode constructions and/or methods of manufacturing electrodes.

BACKGROUND

Rechargeable batteries such as lead-acid batteries can include one or more cathodic electrodes that may be constructed by casting lead, expanding lead sheet, or creating a lead alloy foil with punched grid pattern. Typically the cathodic electrode is comprised of 100% lead or lead alloy. Rechargeable batteries such as lead-acid batteries also can include one or more anodic electrodes that utilize a lead oxide, or derivative, pasted onto a traditional lead battery electrode substrate.

SUMMARY

The electrodes of the present disclosure can be configured to be utilized in standard lead acid battery manufacturing processes and equipment.

The present disclosure provides low cost, light weight, and advanced battery electrodes for use in lead acid batteries. The electrodes may be utilized as a negative electrode and can provide for improved negative-active-material utilization, more uniform current distribution, and enhanced cycle life performance.

Battery electrodes are provided that can include a conductive core supported by a polymeric frame.

Methods for manufacturing battery electrodes are provided that can include: providing a sheet of conductive material; and framing the sheet of conductive material with a polymeric material.

Batteries are provided that can include a plurality of electrodes, with individual ones of the electrodes comprising a conductive core supported by a polymeric frame.

DRAWINGS

Embodiments of the disclosure are described below with reference to the following accompanying drawings.

FIG. 1 is a fragment of an electrode according to a process of the disclosure.

FIG. 2 is an electrode substrate according to an embodiment of the disclosure.

FIG. 2A is a cross section of the electrode of FIG. 2 according to an embodiment of the disclosure.

FIG. 3 is an electrode substrate according to an embodiment of the disclosure.

FIG. 3A is a cross section of the electrode of FIG. 3 according to an embodiment of the disclosure.

FIG. 7A is a section of the electrode substrate of FIG. 7 according to an embodiment of the disclosure.

DESCRIPTION

Figure 4:
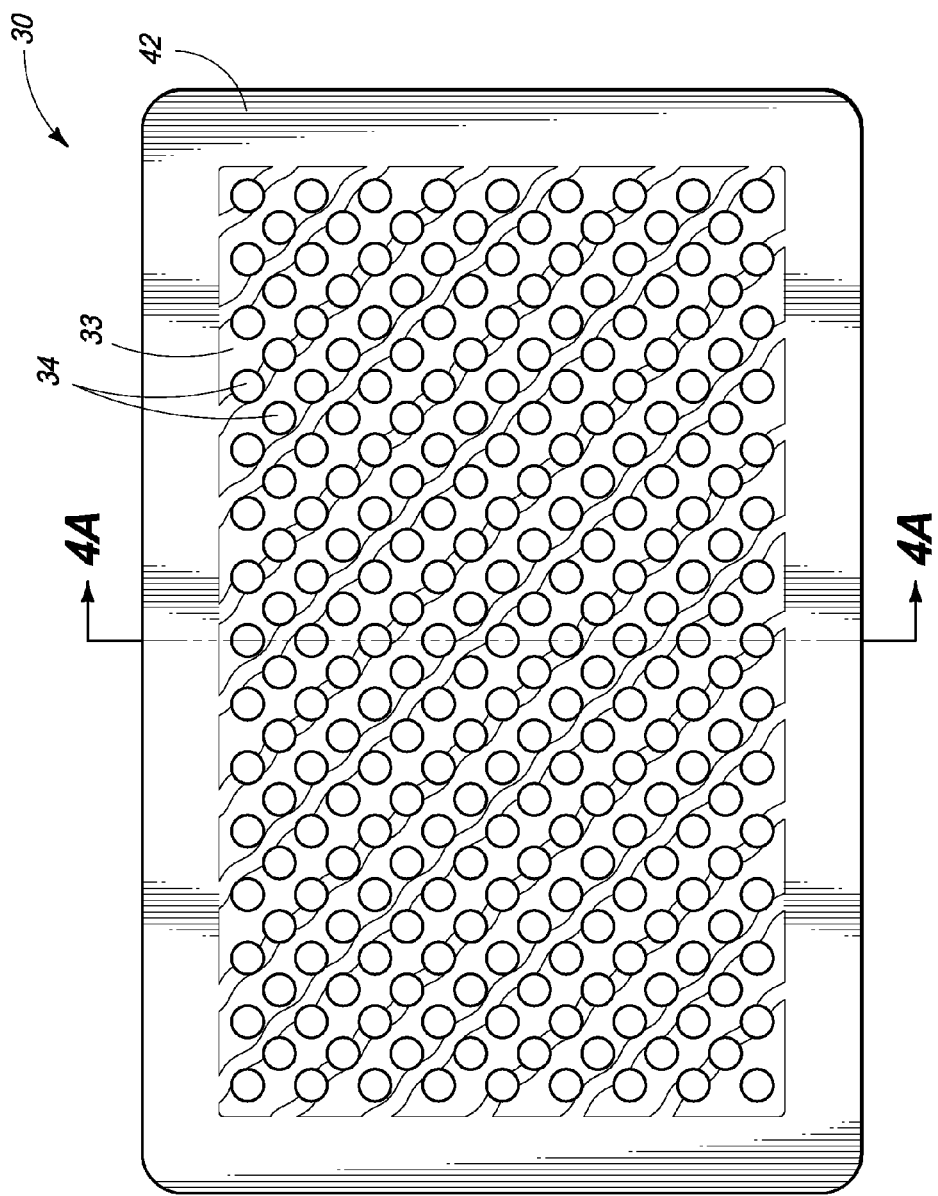
FIG. 4 is an electrode substrate according to an embodiment of the disclosure.

This disclosure is submitted in furtherance of the constitutional purposes of the U.S. Patent Laws "to promote the progress of science and useful arts" (Article 1, Section 8).

The electrodes, batteries, electrode production methods, battery production methods, rechargeable batteries, lead acid batteries, battery components, and battery methods of the disclosure will be described with reference to FIGS. 1-10.

Referring first to FIG. 1, an example portion of an electrode of the present disclosure is shown at stages of processing according to an embodiment of the disclosure. Accordingly, a method for manufacturing a battery electrode is provided that can include providing a sheet of conductive material 2. Material 2 can be a sheet, extruded, diecast, or thixomolded as well of electrically conductive metals or alloy of the same. Material 2 can have another material 4 applied thereto.

Material 4 can provide an acid protective barrier to material 2. Material 4 can be inert to acid solutions such as those used for lead/acid batteries. Material 4 can be a lead material such as electroplated lead. Material 4 can be a conductive ink or polymer that is inert to acid for example. Material 4 can provide a homogeneous coating of sufficient thickness to prevent molecules of the conductive metals from migrating into the acid electrolyte of a lead/acid battery. Material 4 can provide a homogeneous acid protective barrier over the conductive material 2. As a polymer, material 4 may also provide structural or architectural support. One or both of the materials 2 and/or 4 can then be framed with a polymeric material 6.

Referring to FIGS. 2 and 2A, a component of a battery is depicted as electrode substrate 12 and a cross section of same is shown in FIG. 2A. This substrate can be a three-dimensional structure that may be stamp molded, injection molded, and/or otherwise fashioned to a final geometric shape as desired. The substrate can be substantially planar having planar side 13 and edge 15, for example. Substrate 12 can vary in shape as desirable and may be dependent upon the final battery design. As shown, substrate 12 does not include a tab or post, but other embodiments may include same as well as other features that may facilitate production and/or use.

Substrate 12 can be described to have at least two portions with one of the two portions being configured to extend into battery solute and the second of the two portions being configured to reside outside the battery solute such as one or more tabs 52 that may be configured to couple to a connecting post, for example (see, e.g., FIGS. 5-8). Accordingly, methods for production of the electrodes can include forming a contact tab 52 along an edge of the sheet of conductive material 18, for example. The contact tab may be at least partially encased with the polymeric material 22. The tab location, size and/or shape may change commensurate with battery design as desired. The substrate or portions thereof, particularly the portion within the battery solute may be inert wherein it may be inert to conditions typically present in batteries, such as, for example, current flows, heat, dissipation of heat, and/or acidic conditions relating to the battery solute, for example.

Substrate 12 may include recesses such as openings 14. Openings 14 may be spaced randomly throughout substrate 12 and may be utilized as a support feature to facilitate the binding of materials such as lead paste material to substrate 12 at a later stage of electrode preparation processing. Openings 14 can have sidewalls 17 extending between planar surfaces 13 of electrode 12, for example. At least a portion of the sidewalls 17 and surfaces 13 can be considered edges of the openings 14 and these edges may be angled and/or beveled, for example. Accordingly, methods for producing electrodes can include providing a plurality of openings within the sheet of conductive material 18.

In accordance with example implementations, substrate 12 may have openings therein, or it may not have openings therein. Where openings are present, the electrode may include additional materials in the form of layers and/or lines deposited and/or etched thereon. These materials may extend via the openings between opposing surfaces of the substrate. For example, materials, such as conductive materials, lead oxide, and/or lead paste materials may be associated with planar surfaces (sides) 13 as well as sidewalls 17. In accordance with example implementations, one or more of these materials may extend through openings 14 closing opening 14. For example, lead paste material can extend through opening 14 effectively closing opening 14. In accordance with other embodiments, lead paste material may extend through opening 14 leaving access through opening 14, for example.

In accordance with an example embodiment, substrate 12 can include a core member 18 of conductive material. Accordingly, the electrode can include a conductive core supported by a polymeric frame. This conductive material can be copper, aluminum, and/or magnesium in the form of a sheet, for example. Member 18 can be as thin as about 0.004 inches or from about 0.006 inches to about 0.010 inches thick and/or may be at least about 0.016 inches thick. The sheet can be punched or coined to provide three dimensional shapes as desired. Member 18 may have a flat or planar surface as well. In accordance with example implementations, member 18 may also be a conductive material other than lead, for example, copper, aluminum, silver, gold, nickel, magnesium, and/or alloys of same.

Lead material 19 may be provided over member 18, for example. Material 19 is shown associated with both sides of member 18. Material 19 may be provided to cover and/or encase member 18. Material 19 can be one or more of a substantially pure lead material, lead oxide material, and/or lead alloy material. Alloys of the lead material can include tin alloys, for example. Accordingly, the conductive core can include lead electroplated copper. The lead electroplated copper of the conductive core can be comprised by a sheet being at least about 0.018 inches thick in one cross section. According to other examples, the sheet can be from about 0.019 to about 0.021 inches thick in the one cross section.

Polymeric material 22 can be provided to one or both of member 18 and material 19. Material 22 can include one or more polymeric materials that are inert to acidic conditions such as those that exist in a battery. Polyolefins, polycarbonates, polypropylene, and/or fluoropolymers may be utilized. In accordance with example implementations, material 22 may be overmolded onto one or both of member 18 and material 19. According to an example aspect, the overmolding may provide material 22 in sufficient amount to support the structural integrity of member 18 and material 19, keeping both these components in a substantially planar form.

Referring to FIGS. 3 and 3A, in accordance with an alternative embodiment, substrate 12A is provided to include a support structure for lead paste. Material 22 can be further overmolded to support one or both of member 18 and material 19 as well as form a lattice structure. This lattice structure can be configured to support lead paste, the application of which can form a completed electrode. As shown the lattice structure is in a "diamond" formation, however other formations are contemplated, including but not limited to, horizontal/vertical supports.

As discussed, lead paste material can be associated with and/or supported by substrate 12 and/or 12A. The lead paste material may cover all or a portion of the substrate and it may cover all or a portion of lead material 19 encasing member 18 where applied. The lead paste material can be applied to both sides of the substrate. In accordance with example implementations, this application may be to only one side.

The substrate may have one or more recesses such as openings extending there through. These recesses such as openings can be filled with the lead paste material and extend through the openings leaving at least a portion of the openings clear, or for example, completely close the openings. The formulation of this lead paste material is known to persons of ordinary skill in the art of lead-acid battery production and is not critical to the present disclosure. The lead paste material may include additives, for example, that can be used to increase surface area. In accordance with example configurations, lead paste material can be considered porous when compared to the lead material described above. The substantially pure lead, lead oxide and/or lead alloys of the lead material can be substantially homogenous thereby preventing battery solutes from contacting the conductive material.

Figure 4A:
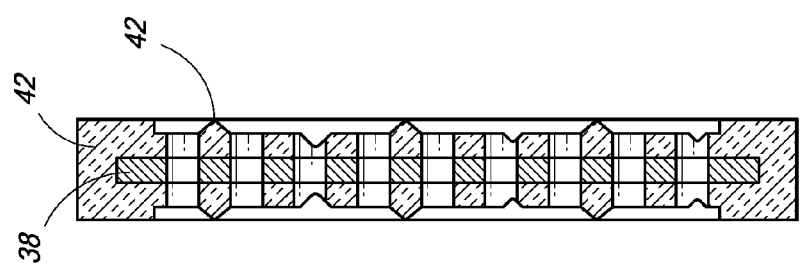
FIG. 4A is a cross section of the electrode of FIG. 4 according to an embodiment of the disclosure.

Referring to FIGS. 4 and 4A, in accordance with yet another embodiment, member 38, as described above, can be completely overmolded with a conductive yet acidic inert polymeric material 42. Material 42 can be a polymeric material that includes carbon for example, giving the material some conductivity. Material 42 can be overmolded onto member 38 to support member 38 as well as provide support for lead paste material described. Such support structures can include but are not limited to indentations and/or extensions. Substrate 30 can include a planar surface 33 as well as openings 34.

Figure 5:
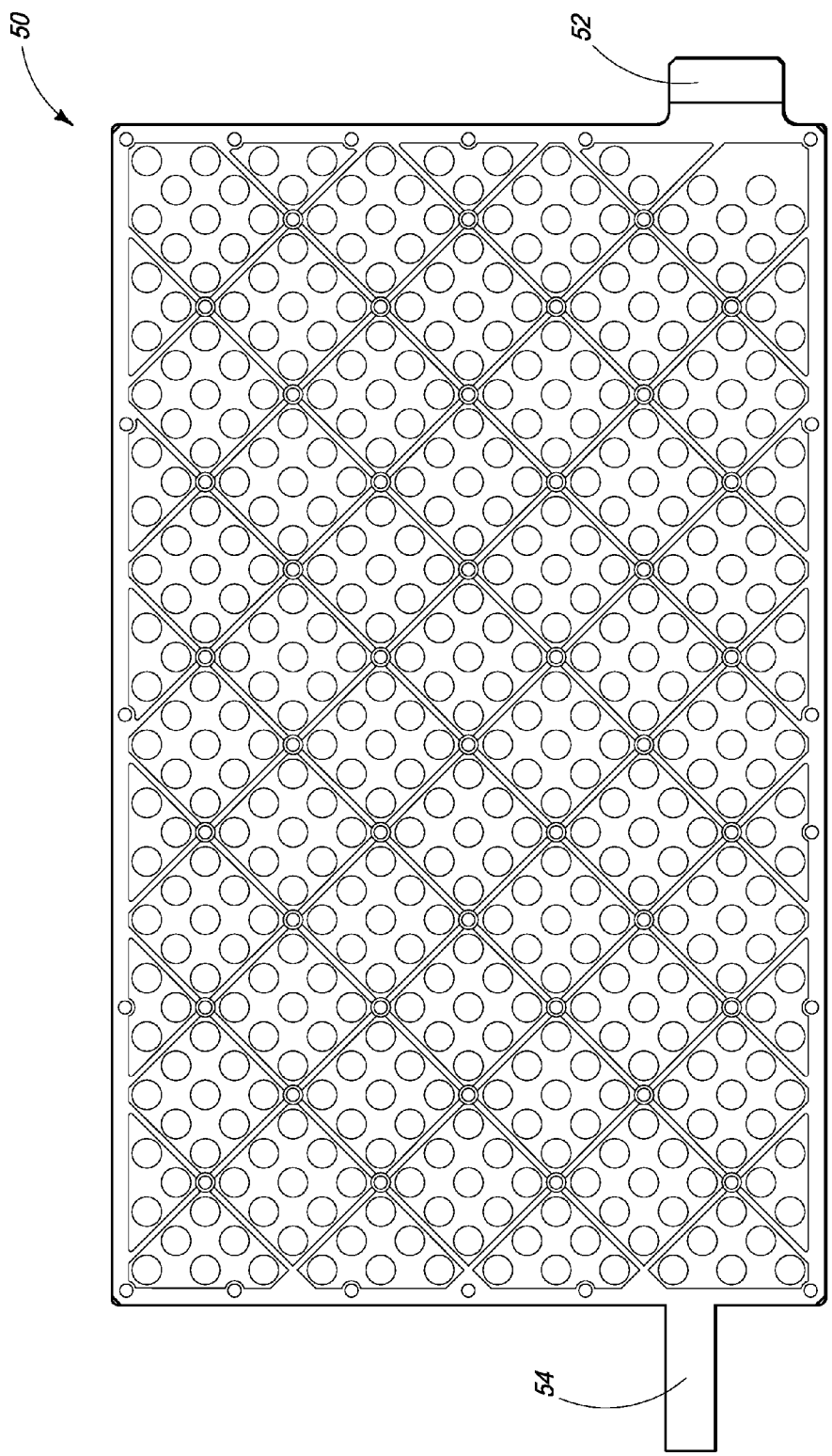
FIG. 5 is an electrode substrate according to an embodiment of the disclosure.

Referring to FIG. 5, another example substrate 50 is depicted that includes tab 52 as well as lug 54. Tab 52 can be an extension of the member of substrate 50 and can be utilized as a post of the completed electrode. Lug 54 can be an extension of the polymeric material and can be used during the processing phase and removed before use as an electrode, for example. Accordingly, methods of forming the electrodes can include forming a polymeric tab along at least one edge of frame and/or include forming a contact tab along and at least one opposing edge of the frame. Processing the electrode can include conveying the electrode using the polymeric tab and/or contact tab as dogs.

Figure 6:
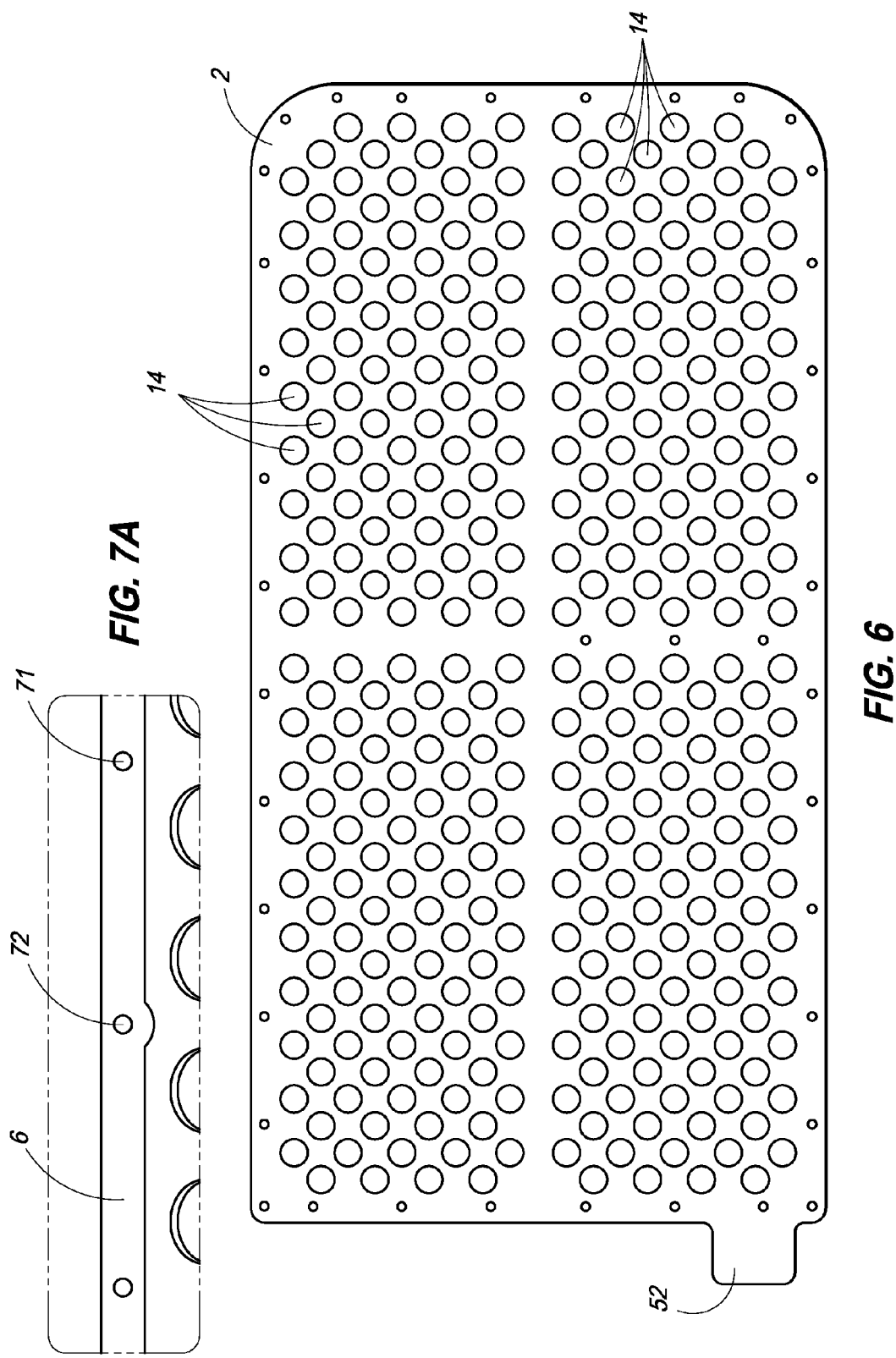
FIG. 6 is a portion of an electrode substrate according to an embodiment of the disclosure.
Figure 7:
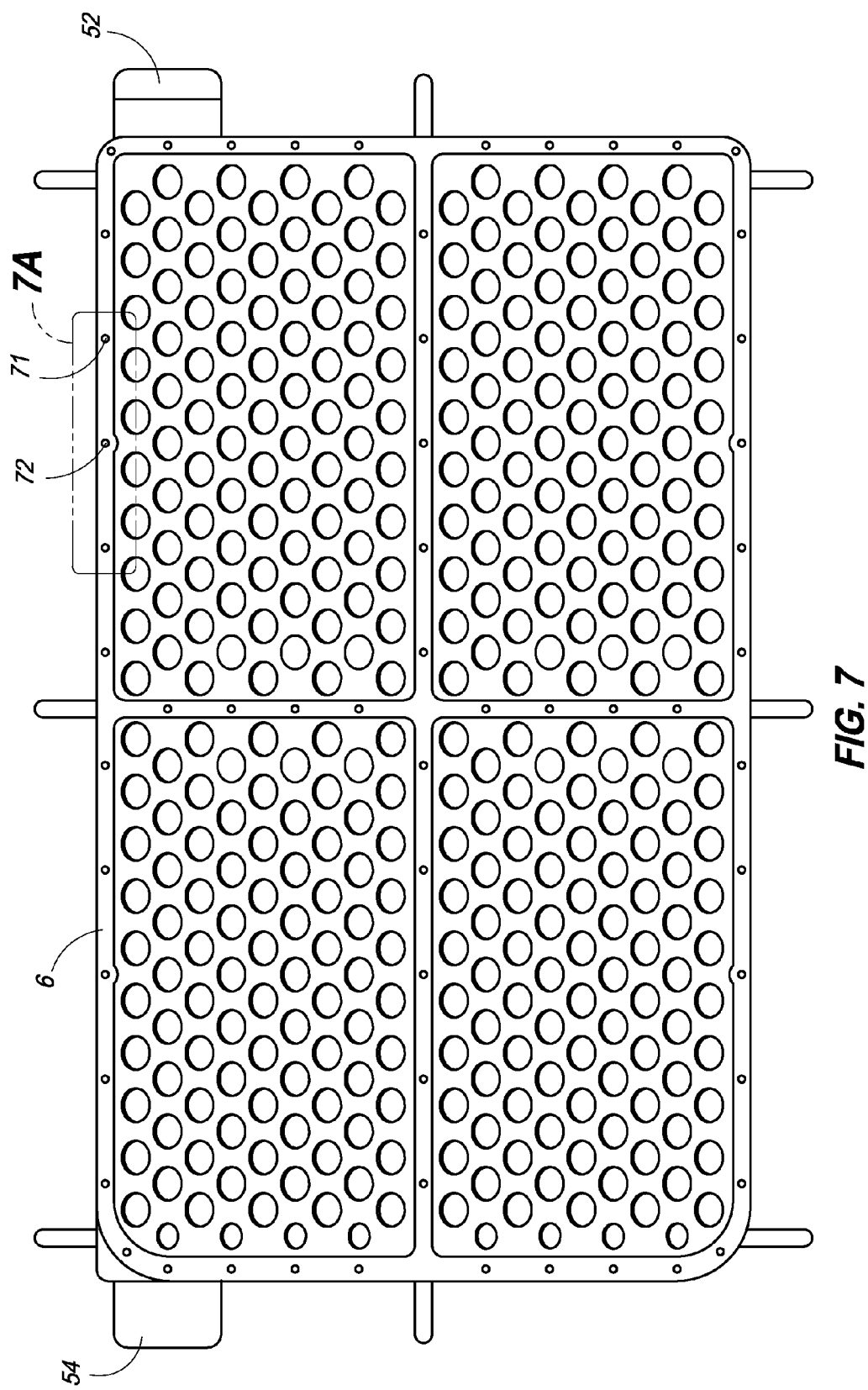
FIG. 7 is an electrode substrate according to an embodiment of the disclosure.
Figure 8:
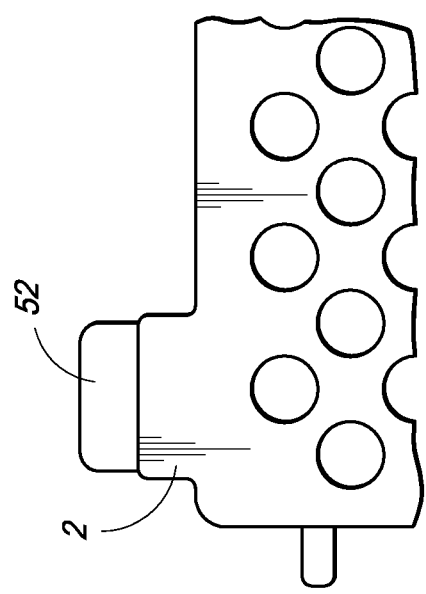
FIG. 8 is a portion of an electrode substrate according to an embodiment of the disclosure.

Referring to FIG. 6, a detailed depiction of conductive material 2 is shown as a sheet of copper. In accordance with example implementations, material 2 can have openings 14 therein as well as tab 52. Referring to FIGS. 7 and 7A material 2 is shown at another stage of processing. Accordingly, the electrode includes polymeric material frame 6 encompassing conductive core 2. Referring to FIG. 7A, a section of the electrode is shown to detail perimeter opening sizing differences, such as opening 72. These differences may be exploited to assist with electroplating of material 2, for example. Some perimeter openings 71 can have a diameter of about 0.062 inches while other openings can have a diameter of about 0.075 inches. Material 6 can be provided to extend outwardly from the larger openings, such as 72 for example. Referring to FIG. 8, a more detailed view of tab 52 at least partially encased in material 2 is shown.

Figure 9:
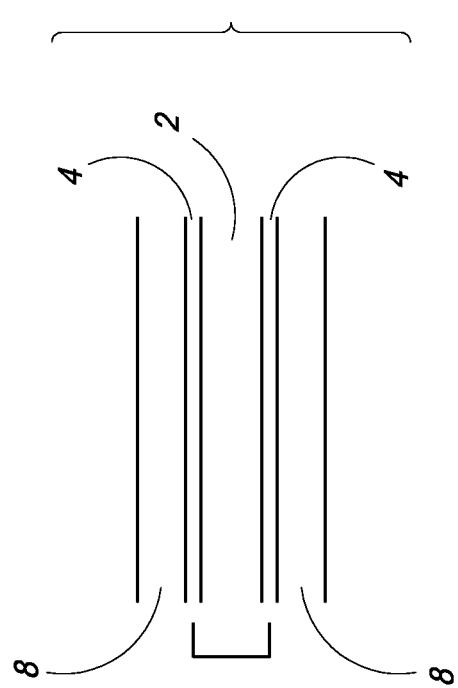
FIG. 9 is a section of an electrode substrate according to an embodiment of the disclosure.

Referring to FIG. 9 an example electrode fragment is shown to demonstrate the overall thickness and contribution of this thickness of the various materials. Accordingly, conductive material 2 may have a thickness of from about 0.014 to about 0.016 inches and lead material 4 can have a thickness of about 0.001 inches, giving the combination of conductive material 2 (0.016) and lead material and overall thickness of about 0.018 inches. Lead paste material 8 can be provided to the electrode to a thickness of from about 0.020 to about 0.025 inches giving an overall thickness of the electrode of about 0.058 inches. Accordingly to example embodiments, this electrode thickness has never been operatively achieved and substantially changes the overall weight and/or performance of the battery using one or more of these electrodes.

Figure 10:
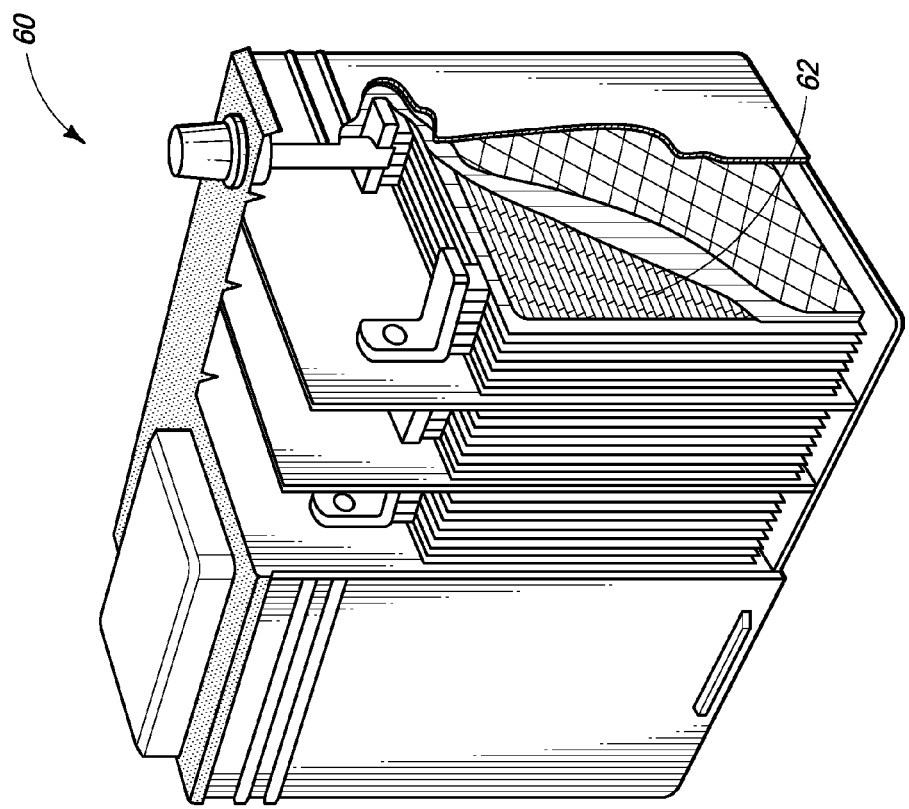
FIG. 10 is a battery including electrodes according to an embodiment of the disclosure.

Referring to FIG. 10, an example battery 60 is shown that includes a plurality of electrodes 62. One or more of the electrodes 62 can be configured as described herein. Batteries described herein can include flat-plate, tubular, circular, and/or bi-polar batteries. The battery can be at least one of a plurality of batteries within a bank of batteries, for example. As another example, the battery can be configured as a bank of individual batteries. In accordance with example implementations, storing electricity within these batteries can include providing electrical current to the battery. The battery can have an electrode that is both inert to the battery solute and include non-conductive material. The electrical current can be provided to one or more post components in electrical communication with one or more of the plurality of electrodes of like polarity. The battery can include a plurality of electrodes, individual ones of the electrodes including a conductive core supported by a polymeric frame. At least one of these electrodes can define a conductive tab electrically coupled to the conductive core.

In compliance with the statute, embodiments of the invention have been described in language more or less specific as to structural and methodical features. It is to be understood, however, that the entire invention is not limited to the specific features and/or embodiments shown and/or described, since the disclosed embodiments comprise forms of putting the invention into effect.

The invention claimed is:

1. A method for manufacturing a battery electrode comprising:
   providing a sheet of conductive material;
   framing the sheet of conductive material with a polymeric material;
   forming a contact tab along at least one opposing edge of the frame; and
   conveying the electrode using the polymeric tab and/or contact tab as dogs.

2. The method of claim 1 further comprising forming a contact tab along an edge of the sheet of conductive material.

3. The method of claim 2 further comprising framing the contact tab with the polymeric material, the framing exposing a portion of the tab.

4. The method of claim 1 further comprising forming a polymeric tab along at least one edge of the frame.

5. The method of claim 1 further comprising providing a plurality of openings within the sheet of conductive material.

6. The method of claim 1 further comprising electroplating the conductive material.

* * * * *